Nov. 20, 1934.  H. HUEBER ET AL  1,981,839
WINDSHIELD CLEANER OPERATED FROM THE MOTOR VEHICLE LUBRICATING SYSTEM
Filed Feb. 13, 1930   2 Sheets-Sheet 1
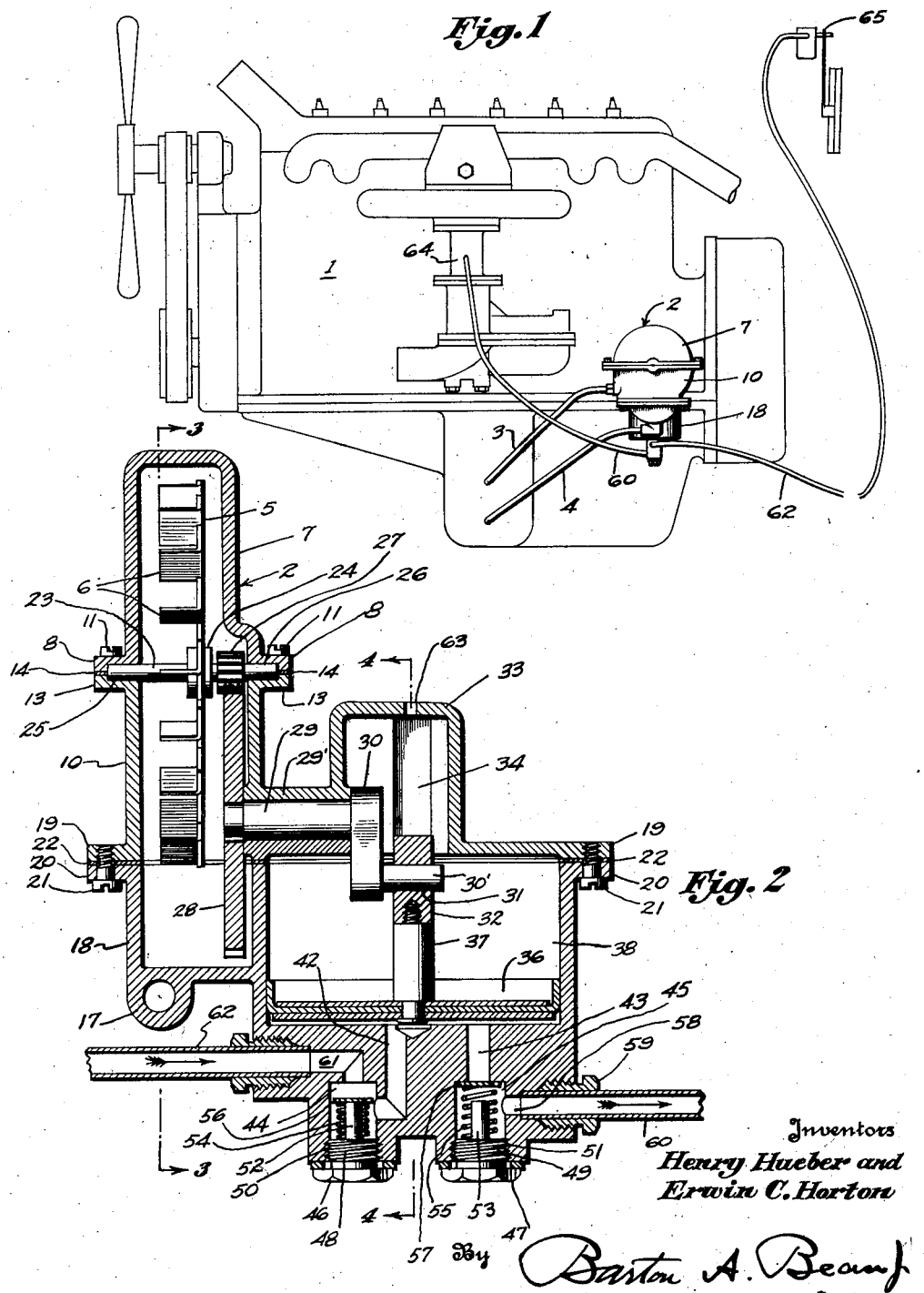

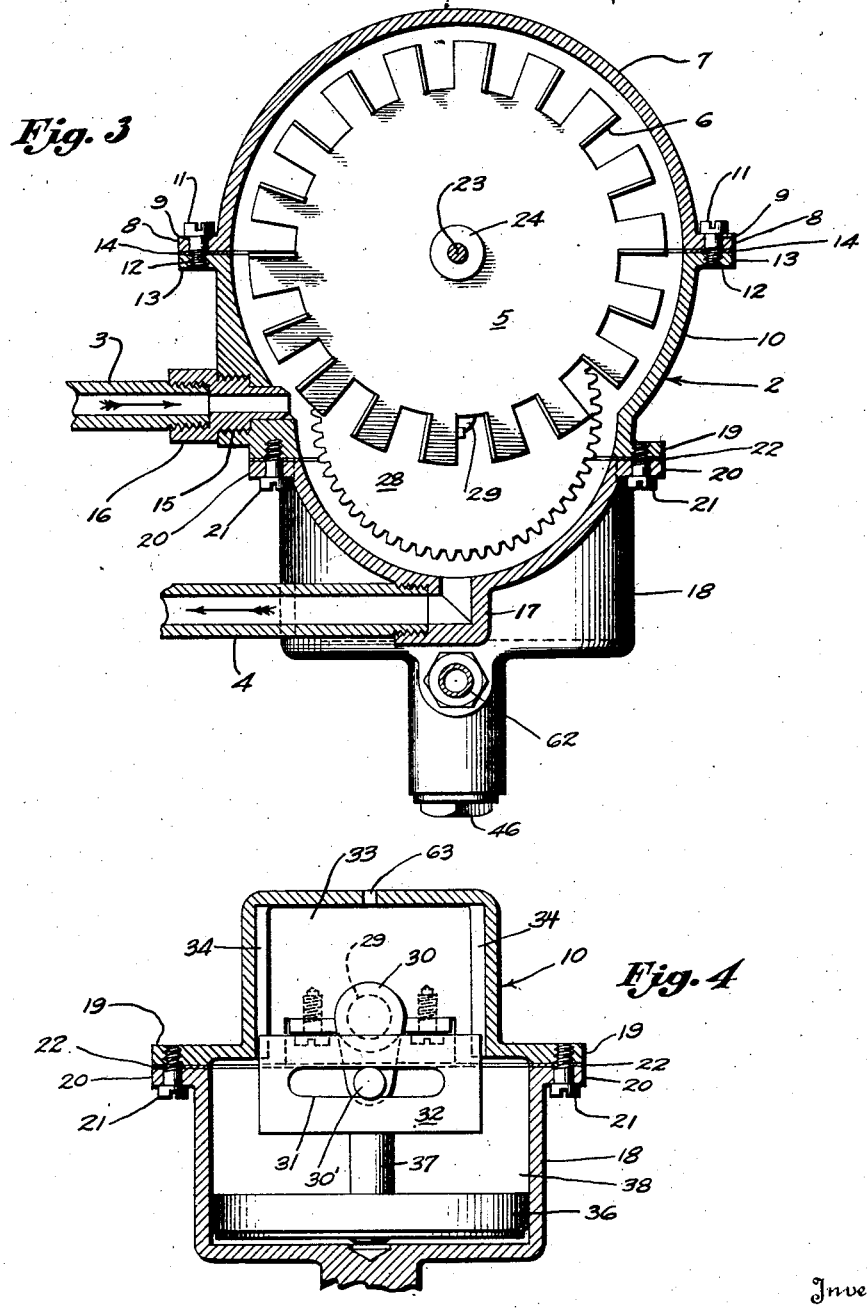

Patented Nov. 20, 1934

1,981,839

UNITED STATES PATENT OFFICE 1,981,839

WINDSHIELD CLEANER OPERATED FROM THE MOTOR VEHICLE LUBRICATING SYSTEM

Henry Hueber, Buffalo, and Erwin C. Horton, Hamburg, N. Y., assignors to Trico Products Corporation, Buffalo, N. Y.

Application February 13, 1930, Serial No. 428,173

REISSUED

7 Claims. (Cl. 60—60)

The present invention relates to a device which is adapted to produce or maintain a difference of fluid pressure in a line in which it is introduced, and acts more particularly as a booster when attached in a line leading from the intake manifold of an internal combustion engine to a motor of the suction type to actuate said motor, which may be that of a windshield wiper.

In the operation of suction motors attached to windshield wipers presently in use, it has been found that when the suction is derived from the intake manifold of an internal combustion engine, the suction motor does not operate at a sustained rate of speed but varies with the load on the internal combustion engine. Under certain operating conditions of an internal combustion engine, however, the suction in the intake manifold is not sufficient to actuate such a differential pressure motor at the desired constant speed.

The vision of the operator through the windshield is thereby lowered at those times when the best visibility is desired, i. e., on starting, or pulling under load, up hill, etc.

To maintain or increase the speed of such a pressure motor it is necessary to sustain a decreased pressure in the operating cylinder chamber thereof. The instant invention provides mechanically operated means in the line from the intake manifold to the motor of a windshield wiper for providing sustained and constant suction to maintain the desired speed of the motor accessory.

An object of the invention is to provide a uniform suction for maintaining a constant speed of the motor of a windshield wiper.

Another object is to provide a booster in the suction line from the intake manifold of an internal combustion engine to the motor of a windshield wiper whereby the speed of said motor is maintained at a substantially constant rate irrespective of the load on the internal combustion engine.

A still further object is to provide a pump for supplying fluid pressure to a line from the intake manifold of an internal combustion engine to the motor of a windshield wiper, using the oil pressure of the lubricating system as the driving force for said pump.

A further object is to provide suction augmenting means, disposed in the passage from an automobile accessory to the intake manifold of the engine of a motor vehicle, designed to operate under those conditions when the fluid pressure in the intake manifold, resisting its operation, is overcome by the fluid pressure of the circulating fluid system, thereby rendering the augmenting means operable.

In the drawings:

Fig. 1 is a schematic view of an internal combustion engine with the pumping device attached.

Fig. 2 is a sectional view of the improved suction augmenter.

Fig. 3 is a view through line 3—3 of Fig. 2.

Fig. 4 is a view through line 4—4 of Fig. 2.

Referring more particularly to the drawings, an internal combustion engine having an oil pressure lubricating system is designated generally by the numeral 1.

The booster 2 is connected by tube 3 to a circulating fluid system such as the lubricating system of said engine whereby oil under pressure is led from said supply to said booster for operating the same, and after expending its energy therein the oil is returned to the oil reservoir by the return pipe line 4.

The booster comprises a pumping element and a drive therefor. The drive preferably consists of a rotor or turbine disc wheel 5, having radial impeller blades 6 conveniently stamped from the disc and turned inwardly, substantially at right angles to the disc. The rotor is contained within a housing which, for ease in construction and assembly, consists of an upper portion 7, a central portion 10 and a lower portion 18. The upper housing portion 7 is substantially semi-circular in shape to fit over the said rotor and allow sufficient clearance between said rotor and the inner side of said housing, and is provided with an outwardly extending flange 8 at its lower edge for attachment to the central housing portion. Holes 9 are provided through which screws 11 are inserted for attaching the central housing portion 10, by means of threaded holes 12 in the outwardly extending flange 13 at the upper edge of said central housing portion. A substantially oil and gas tight connection is produced at the juncture of the flanges 8 and 12 by inserting a gasket 14 therebetween.

A female threaded inlet port 15 is provided adjacent the lower portion of the central housing portion and extends transversely thereinto, tangential to the periphery of said rotor 5. A threaded nipple 16, adapted to fit and engage within said threaded port, is provided with internal threads adjacent the outer end for threading engagement with the oil feed tube 3, so that when in assembled relation oil under pressure is caused to impact against the said impeller blades 6 causing continuous rotation of the said rotor 5 so long as the impelling force of the oil is greater than the force upon the pump attached to said rotor.

An outlet port 17 in the shape of an elbow is provided in the lower housing portion 18 for connection with the outlet tube 4 for carrying the oil, which has expended its kinetic energy, to the oil reservoir of, or back into, the lubricating system.

The lower housing portion is adapted to enclose the lower portion of the said rotor 5 and is connected with flange 19 of the said central portion by means of the contacting flange 20 of the lower portion through which screws 21 engage. A gasket 22 is inserted between said flanges 19 and 20 to provide an oil tight connection.

The rotor 5 is mounted within these housing portions by means of a hub 24 upon a shaft 23 which is journalled at 25 and 26 in seats provided at the juncture of the flanges 8 and 12 of the upper and central housing portions 7 and 10 respectively. A shaft 29, carried within a sleeved extension 29' of the central housing portion 10 is provided, at one end, with a gear 28 adapted to mesh with a gear 27 on the shaft 23, and at its other end with a crank 30 which has a crank pin 30' engaging in a slot 31 of a cross-head 32. Said cross-head, under influence of said crank, reciprocates within a well 33, carried by the sleeve extension 29' of the central housing portion 10.

The cross-head 32 is constrained in its movement within the well 33 by guideways 34 formed on the inner side of said well, and is connected to the piston 36 by the piston rod 37.

The piston rod is of such length that when the piston is in the lowered position a substantial clearance is provided between the piston head and the cylinder head to allow free flow of fluid from the inlet to outlet ports during the resting as well as operating periods of the piston.

The reciprocating motion of the cross-head is transmitted to the piston 36 which is contained within the cylinder 38 formed in the lower housing portion 18. A breather hole 63 is provided in the pump casing above the piston.

An inlet port 42 and an outlet port 43 are contained in the cylinder head and provided with valve chambers 44 and 45. Check valves are provided in the chambers which consist of plugs 46, 47 having threaded portions 48 and 49 adapted to fit into the threaded openings 50 and 51 respectively in the cylinder head. Reduced ends 52 and 53 of said plugs extend into the valve chambers 44 and 45, respectively, and act as retainers for springs 54 and 55 which urge the valve heads 56 and 57 to seat against the head of the valve chambers.

The chamber 45 is centered with respect to the outlet port 43 while chamber 44 is displaced with respect to the port 42, said port connecting therewith through the side of said chamber 44.

A venting orifice 58 in the side of valve chamber 45 connects said chamber by means of the exteriorly threaded hollow nipple 59 with a tube 60 which connects to the suction or intake manifold 64 of the internal combustion engine 1.

The valve chamber 44 is provided with a centered inlet orifice 61 which is connected by means of a hollow nipple to a pipe 62, leading to a point at which reduced pressure or suction is desired for instance to a differential pressure motor attached to an automobile accessory such as a windshield wiper 65.

In the operation of the instant invention when tube 60 is connected to the intake manifold of an operating internal combustion engine, the fluid pressure within said manifold being less than atmospheric pressure causes air to enter tube 62. If this tube 62 be connected to a differential pressure motor such as the well known suction motor of a windshield cleaner, pressure in the chamber of said motor will be reduced and said motor become operable.

Since the engine is in operation, oil from the pressure lubricating system is also acting to operate the pump, entering through the tube 3 and impinging upon the blades 6 of the rotor 5 to impart movement thereto which is transmitted through the gears 27 and 28 to the crank 29, which in turn transmits reciprocating motion to the piston 36. On the intake stroke the valve in chamber 45 tends to seat and that in chamber 44 to be depressed thus allowing air to be drawn into the cylinder 37, exhausting through the breather hole 63. On the exhaust stroke the opposite action is produced and air expelled through tube 60 to the intake manifold.

When the internal combustion engine is running normally the suction in the intake manifold is sufficient to unseat the valves in both chambers and draw air through inlet 62 into chamber 44 and into the cylinder, since there is clearance between the cylinder head and the piston in its lowermost position, through the outlet 43, thence through chamber 45 and so into the intake manifold.

With the manifold suction of a sufficient degree, the auxiliary device may remain idle or at rest, and since the impelling force, the circulating lubricant, is a resistible flow of fluid, the action of the manifold suction is such as to arrest the pumping action in more or less complete counteraction to the rotor motion or urge. In other words the piston is held by the manifold suction against reciprocation regardless of the flowing of the lubricant against the rotor. This arrest of the auxiliary device takes place without injury to the mechanism and avoids unnecessary wear of parts which occurs in a constantly operating device.

The lubricating system therefore continues to function regardless of the pressure of the pump therein or of the resistance offered thereto by the manifold suction. This is insured by reason of the clearance about the rotor which constitutes a by-pass or passage about the driven element 5 to permit free flow of the lubricant when the pump is arrested or retarded by the manifold suction.

What is claimed is:

1. In a motor vehicle power plant including an internal combustion engine, and its circulating fluid system, a suction operated accessory, a passage connecting to the accessory, a motor housing having a plurality of chambers, a rotor contained in one chamber having inlet and outlet ports connected into the fluid system, said inlet port disposed in said rotor chamber tangential to said rotor and said rotor having clearance in its chamber permitting fluid flow past the rotor, and operative connections from said rotor to pumping means contained in another of said chambers, said pumping means being responsive to a predetermined pressure in the passage for resisting fluid actuation of the rotor.

2. In a motor vehicle power plant including an internal combustion engine, its circulating lubricating system, and a suction operated accessory; a suction pump connected to the accessory for providing an operating suction therefor, a motor for operating said pump, said motor comprising a motor chamber interposed in and forming a part of the circulating lubricating system, and a drive member arranged in the chamber and connected to the pump for operating the latter, the lubricant being discharged into the chamber and against the drive member in jet form whereby the lubricant may by-pass the drive member when the latter is abnormally resisted.

3. In a motor vehicle power plant including an internal combustible engine, its circulating fluid system and its intake manifold, a suction operated accessory, a passage connecting the accessory to the intake manifold, an auxiliary suction pump interposed in said passage and responsive to predetermined pressure conditions therein, a rotor interposed in the said circulating fluid system to be operated by the fluid and permitting fluid slippage thereby when abnormally resisted, and operative connections between said pump and rotor.

4. In a motor vehicle power plant including an internal combustible engine, its circulating fluid system and its intake manifold, a suction operated accessory, a passage connecting the accessory to the intake manifold, a suction pump interposed in said passage, a rotor interposed in the said circulating system, and operative connections between said pump and rotor, said rotor being rendered automatically operable and inoperable in accordance with predetermined differences between the fluid pressures in the said connection passage and said circulating system.

5. In combination with the intake manifold and the lubricating system of a motor vehicle internal combustion engine, a suction operated accessory, and a passage connecting the accessory to the manifold, of a suction booster pump having valved inlet and outlet ports connected into the passage for permitting a flow of fluid under negative pressure from the accessory to the manifold, and a fluid motor for said pump including a fluid driven element operated upon by the lubricant of said system for actuating the pump to create a boosting supply of negative pressure for the operation of said accessory, said motor having a passage about said element for permitting flow of the lubricant in said system when the manifold suction preponderates the pressure of the lubricant flow on said element.

6. In combination with an internal combustion engine having a circulating lubricating system, a suction operated accessory and a conduit for connecting the accessory to a source of pressure less than atmospheric pressure, a fluid displacing device connected in said conduit for decreasing the pressure in said conduit relative to atmospheric pressure, said fluid displacing device being operated by a motor connected in the lubricating system to be operated by the flow of lubricant, and said motor being adapted for idle slippage of lubricant therethrough when the pressure in the conduit reaches a predetermined minimum.

7. In combination with an internal combustion engine having an intake manifold and a circulating fluid system, a suction operated accessory, and a conduit connecting the manifold to the accessory, of an auxiliary suction producing device interposed in the conduit and including a chamber, an inlet and outlet thereto having check valves therein, a piston reciprocable in said chamber and responsive to a predetermined pressure in the conduit, a rotor operatively connected to the piston for actuating the same when the fluid pressure in the said manifold is less than a predetermined degree, and a housing for the rotor having an inlet and an outlet connected in the circulating fluid system, said housing between the inlet and outlet having a clearance permitting of fluid circulating by the rotor when movement of the latter is resisted abnormally by the piston.

HENRY HUEBER.
ERWIN C. HORTON.